United States Patent
Zhang et al.

(10) Patent No.: US 12,461,288 B2
(45) Date of Patent: Nov. 4, 2025

(54) RAINBOW REDUCTION FOR WAVEGUIDE DISPLAYS

(71) Applicant: Microsoft Technology Licensing, LLC, Redmond, WA (US)

(72) Inventors: Yifei Zhang, Bellevue, WA (US); Yarn Chee Poon, Redmond, WA (US); Mathew David Watson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 526 days.

(21) Appl. No.: 17/961,451

(22) Filed: Oct. 6, 2022

(65) Prior Publication Data

US 2024/0118468 A1 Apr. 11, 2024

(51) Int. Cl.
*G02B 5/20* (2006.01)
*G02B 5/18* (2006.01)

(52) U.S. Cl.
CPC .......... *G02B 5/208* (2013.01); *G02B 5/1809* (2013.01); *G02B 5/201* (2013.01)

(58) Field of Classification Search
CPC ...... G02B 5/208; G02B 5/1809; G02B 5/201; G02B 5/203; G02B 6/0016; G02B 6/0035; G02B 27/0172; G02B 2027/012; G02B 2027/0178; G02B 5/18; G02B 5/20
See application file for complete search history.

(56) References Cited

U.S. PATENT DOCUMENTS

| | | | |
|---|---|---|---|
| 10,845,596 B2 | 11/2020 | Lee et al. | |
| 11,181,741 B1 | 11/2021 | Yaroshchuk et al. | |
| 11,435,585 B1 | 9/2022 | Yaroshchuk | |
| 2019/0227321 A1 | 7/2019 | Lee et al. | |
| 2019/0377114 A1* | 12/2019 | Wheatley | G02B 5/045 |
| 2020/0371356 A1* | 11/2020 | Khan | G02B 27/0172 |
| 2021/0116712 A1 | 4/2021 | Manly et al. | |
| 2021/0302738 A1* | 9/2021 | Calafiore | G02B 6/3596 |
| 2021/0405402 A1 | 12/2021 | Cheng et al. | |

(Continued)

OTHER PUBLICATIONS

Elsawy, et al., "Numerical Optimization Methods for Metasurfaces", In journal of Laser & Photonics Reviews, vol. 14, Issue 10, Oct. 2020, pp. 1-17.

(Continued)

*Primary Examiner* — Balram T Parbadia
(74) *Attorney, Agent, or Firm* — Workman Nydegger; Jens Christopher Jenkins

(57) ABSTRACT

A rainbow artifact mitigation system includes an angular dependent filter configured to receive light and to transmit light according to one or more angular transmission functions. The one or more angular transmission functions define light transmission as a function of incident angle for the angular dependent filter. The angular dependent filter is configured to at least partially mitigate transmission of light for at least some incident angles above 40°. The angular dependent filter comprises a plurality of nanostructures, and the nanostructures of the plurality of nanostructures are arranged in an array with one or more sub-wavelength periods. The one or more angular transmission functions comprise at least two different angular transmission functions for different regions of the angular dependent filter.

11 Claims, 17 Drawing Sheets

(56) References Cited

U.S. PATENT DOCUMENTS

2023/0213767 A1* 7/2023 Grant .................. G02B 6/005
                                                          345/8

OTHER PUBLICATIONS

Jiang, et al., "Deep neural networks for the evaluation and design of photonic devices", In journal of Nature Reviews Materials, vol. 6, Issue 8, Oct. 2021, pp. 679-700.

International Search Report and Written Opinion received for PCT Application No. PCT/US2023/031367, mailed on Dec. 8, 2023, 13 Pages.

International Preliminary Report on Patentability received for PCT Application No. PCT/US23/031367, mailed on Apr. 17, 2025, 08 Pages.

* cited by examiner

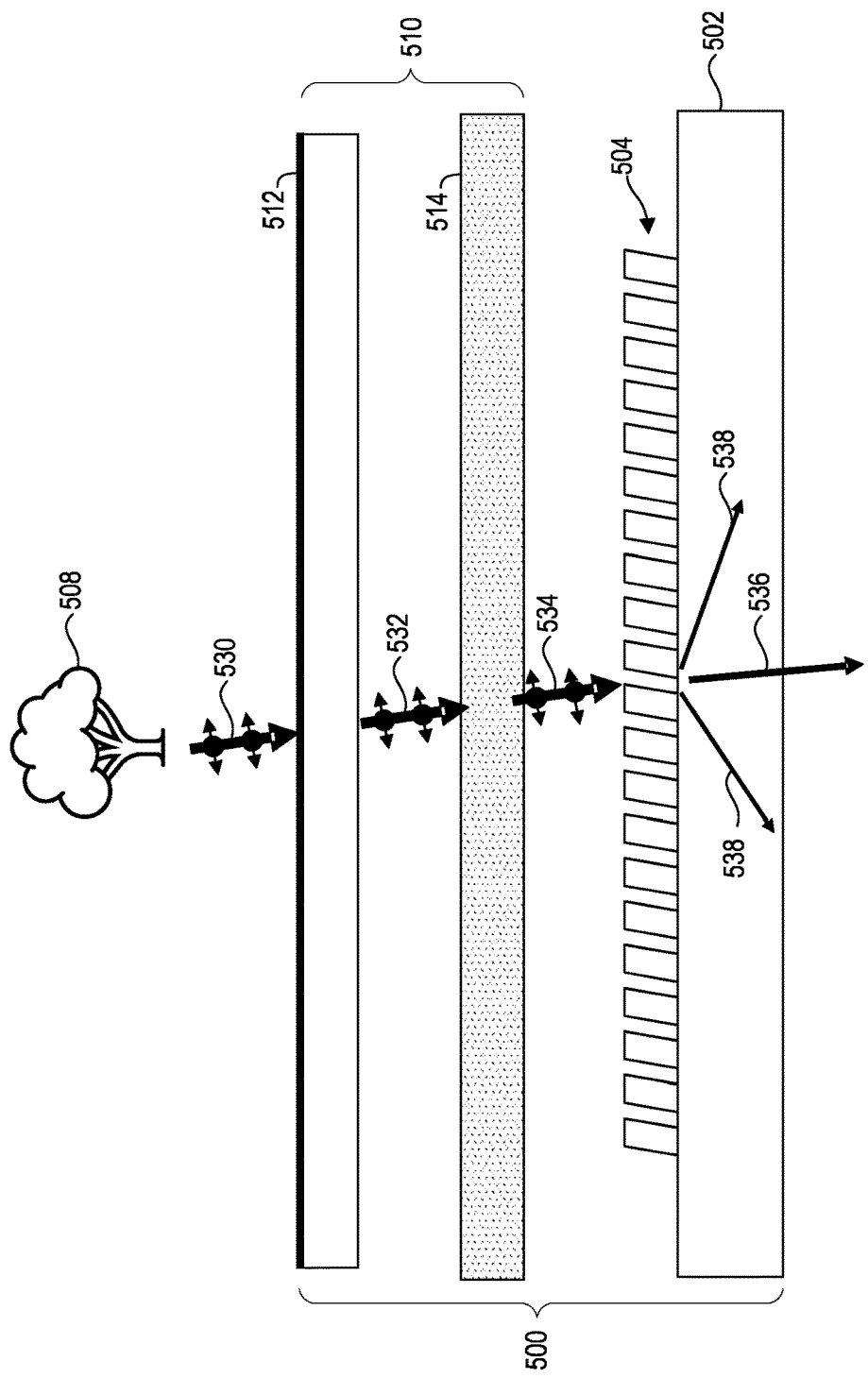
FIG. 5B
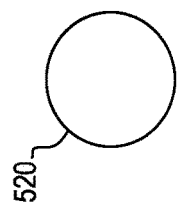

RAINBOW REDUCTION FOR WAVEGUIDE DISPLAYS

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

AR systems typically include transparent display elements through which light for forming images is projected for viewing by an end user. For example, a display element may comprise a set of transparent waveguides (e.g., glass, plastic, or other transparent plates) and a light projection system (e.g., including one or more light sources and one or more microelectromechanical system mirrors) that projects light toward the set of transparent waveguides. The set of transparent waveguides may receive and expand the input light in multiple dimensions to provide a field of view (FOV) through which an image may be viewed by a user. The set of transparent waveguides may also transmit light from the user's real-world environment, enabling the user to perceive the virtual imagery in combination with the real-world environment.

The transparent display elements of AR systems often include optical coupling elements, such as diffractive optical elements (DOEs), to facilitate expansion of display image light and to direct the expanded display image light toward users' eyes. However, DOEs of AR displays can also cause diffraction of environment light. For instance, when light from a light source in an environment (e.g., light from the sun or from overhead lighting) reaches a transparent display element of an AR system from certain angles (e.g., at high incident angles), a coupling element of the transparent display element may cause diffraction of the environment light toward the user's eye, which can cause visible artifacts (e.g., rainbow artifacts) that can degrade user experiences.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 5A and 5B illustrate an example rainbow artifact mitigation system that includes an angular dependent filter and polarization rotator.

DETAILED DESCRIPTION

Figure 1A:
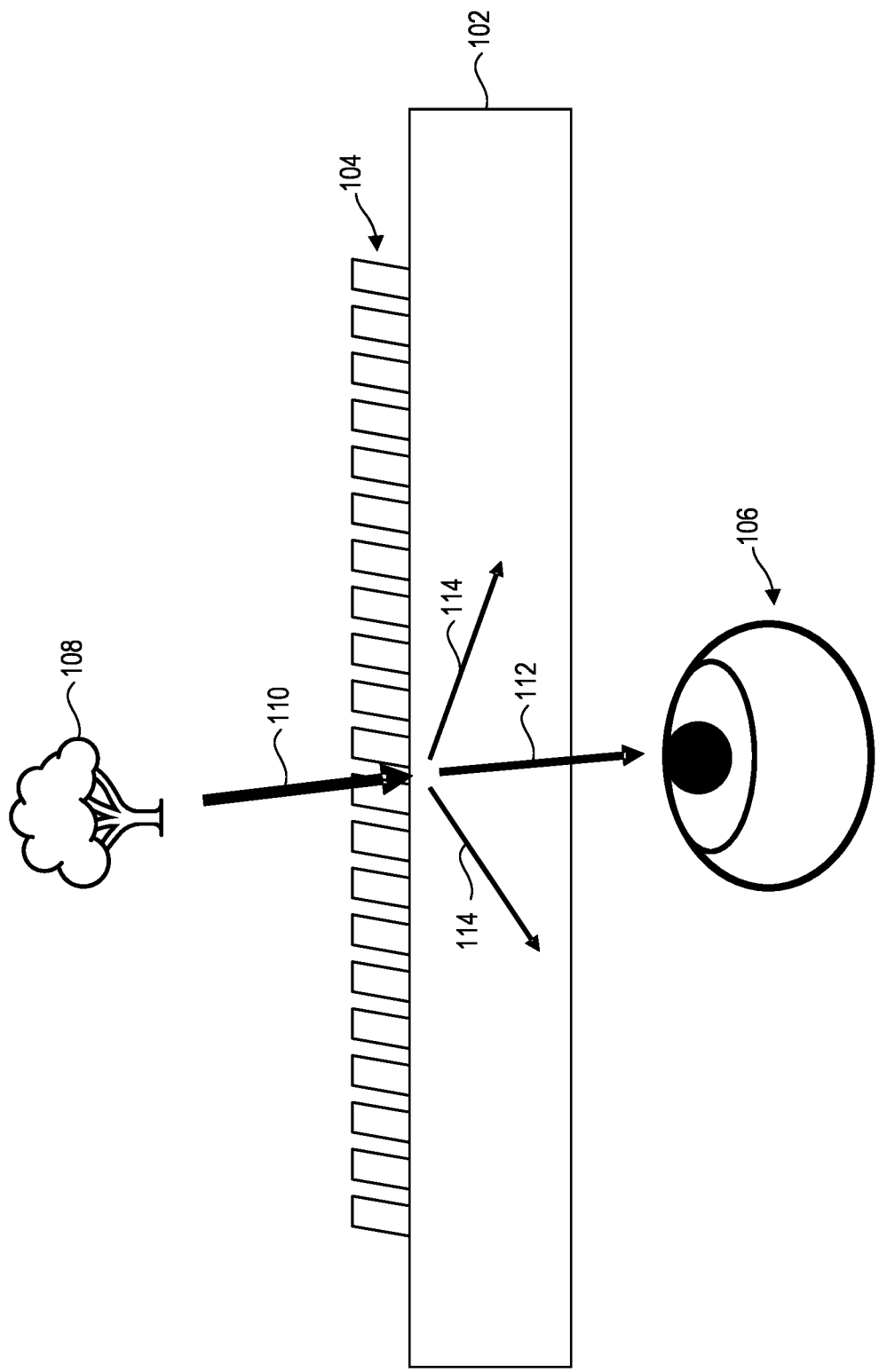
FIGS. 1A and 1B illustrate an example occurrence of a rainbow artifact in a waveguide display system.

Disclosed embodiments are generally directed to systems and devices for reducing rainbow artifacts in waveguide displays. Although the present disclosure focuses, in at least some respects, on display components of augmented reality (AR) systems, one will appreciate, in view of the present disclosure, that the principles disclosed herein are not limited to such implementations and may be applied to other fields of endeavor.

As noted above, waveguide displays often use surface relief gratings (SRGs) for light coupling and view box expansion. One artifact introduced by the SRGs is the rainbow effect, which can be caused by light from high-intensity real world light sources (e.g., the sun and/or overhead lighting) incident on the SRG within certain angle ranges (normally at large angles, far from normal incidence). When such light reaches an SRG, the first order light diffracted by the SRG can be coupled into the user's eyes, causing a rainbow artifact.

As will be described in more detail hereinbelow, rainbow artifacts may be reduced or eliminated by implementing one or more angular dependent filters (and/or other components) with waveguide displays. In some instances, an angular dependent filter incorporates one or more layers of nanoscale/subwavelength structures. In some implementations, the subwavelength size of such structures causes the angular dependent filter to refrain from introducing high-order diffraction and related artifacts.

The layer(s) of the nanoscale/subwavelength structures may be arranged on any surface (or combination of surfaces) of any number of optical elements (e.g., a lens, polarizer, or simply a glass slide) to form an angular dependent filter, thereby advantageously providing a great degree of manufacturing flexibility and enabling use of various kinds of fabrication techniques (e.g., deep UV and/or nanoimprint lithography). The nanoscale/subwavelength structures are configured to restrict or minimize the transmission of real-world light into the system within a particular angle range (e.g., for high incident angles, such as incident angles above about 40°, 45°, 50°, 55°, 60°, 65°, 70°, 75°, 80°, 85°, etc.), while permitting or maximizing the transmission of real-world light outside of the particular angle range. As a result, rainbow artifacts can be reduced or minimized while maintaining the see-through quality of the waveguide display system (and without requiring additional external power, as an angular dependent filter with subwavelength nanostructures is a passive element).

The geometry, shape, layering structure, material compositions, and/or other aspects of such nanoscale/subwavelength structures of an angular dependent filter may be selected/modified to tune the transmission and/or reflection of incident light to achieve a desired angular transmission function (e.g., defining light transmission as a function of incident angle for the angular dependent filter). When an angular dependent filter includes layers of nanoscale/subwavelength structures on multiple surfaces, the angular transmission function describes the overall combined light transmission as a function of incident angle for the multi-surface angular dependent filter.

The nanoscale/subwavelength structures of an angular dependent filter may be implemented as periodic structures, non-periodic structures, or some combination of periodic and non-periodic structures. For example, the rainbow effect can be position dependent, in that the range of incident angles that gives rise to rainbow artifacts can differ depending on the position on the waveguide display (e.g., the x-y position). Thus, different regions of an angular dependent filter may have nanoscale/subwavelength structures with different characteristics, such as period, pitch, height, material, fabrication method, shape, and/or other aspects. Such spatial variance can improve the see-through quality of the angular dependent filter without compromising rainbow reduction performance. Aspects of nanoscale/subwavelength structures of an angular dependent filter may be designed in various ways, such as utilizing geometrical optimization using The DOEs can be designed with geometrical optimization using rigorous coupled-wave analysis (RCWA), finite difference time domain (FDTD) techniques, machine learning optimization methods, and/or other techniques.

In some instances, an angular dependent filter has a broadband response with a similar angular transmission function for different wavelengths within the visible range, whereas in some instances, an angular dependent filter is optimized to have a dispersion effect with different angular transmission functions for different wavelengths (e.g., in order to match the dispersion effect associated with the rainbow effect).

An angular dependent filter may be designed for multiple light polarizations (s and p) or for only one light polarization (s or p). When an angular dependent filter is designed for one polarization, other components may be implemented in addition to the angular dependent filter to facilitate rainbow artifact mitigation, such as one or more linear polarizers or polarization rotators.

Having just described some of the various high-level features and benefits of the disclosed embodiments, attention will now be directed to FIGS. 1A through 11. These Figures illustrate various conceptual representations, architectures, methods, and supporting illustrations related to the disclosed embodiments.

FIG. 1A illustrates a conceptual representation of a waveguide 102 of a display system, such as an MR HMD. The waveguide 102 of FIG. 1A includes a grating structure 104 implemented as a surface relief grating (SRG). The waveguide 102 is configured to internally reflect display light (e.g., display light emitted by a light projection system, such as a laser-based illumination system with one or more MEMS scanner mirrors to direct light toward the waveguide 102) and outcouple the display light toward the eye 106 of a user.

In addition to directing display light toward the eye 106 of a user, the waveguide 102 of FIG. 1A is substantially transparent so as to enable transmission of environmental light toward the eye 106 of the user. For instance, FIG. 1A illustrates an object 108 in an environment and depicts light from the object 108 reaching the waveguide 102 (arrow 110) with a low angle of incidence (e.g., below about 60°, 55°, 50°, 45°, 40°, 35°, 30°, 25°, 20°, 15°, 10°, 5°, etc.). Upon interacting with the grating structure 104 of the waveguide 102, the 0 order light (un-diffracted light) proceeds through the waveguide 102 toward the eye 106 of the user (arrow 112), whereas the first order diffracted light is directed through the waveguide 102 away from the eye 106 of the user (arrows 114).

Figure 1B:
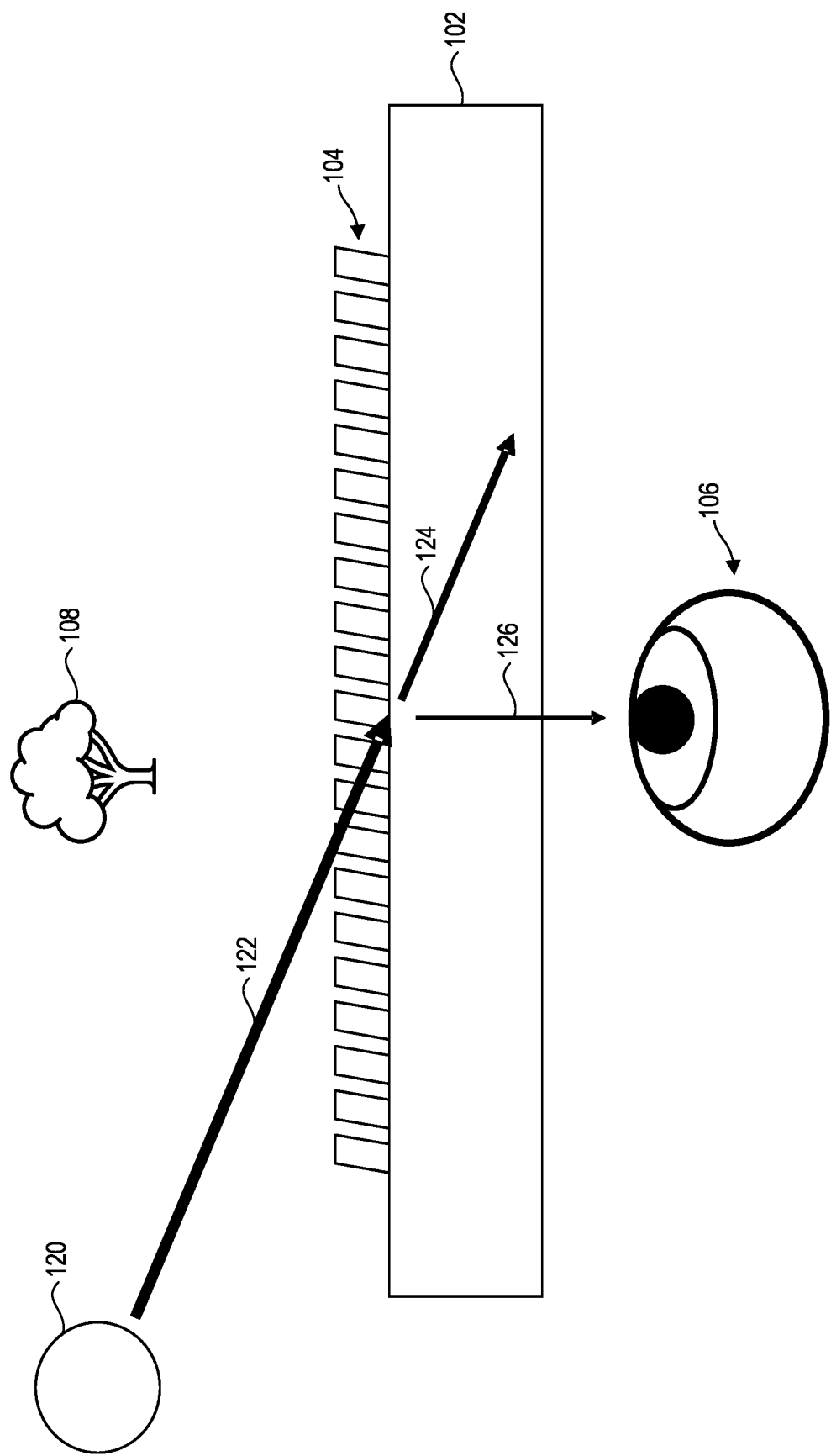

As discussed above, light in an environment output by high-intensity light sources (e.g., the sun, overhead lights, lamps, etc.) can cause rainbow artifacts to be visible to the eye 106 of the user when the incident angle of the light is sufficiently high. FIG. 1B illustrates a light source 120 in the environment that outputs light that reaches the waveguide 102 with a high angle of incidence (arrow 122). Upon interacting with the grating structure 104 of the waveguide 102, the 0 order light (un-diffracted) proceeds through the waveguide 102 without reaching the eye 106 of the user (arrow 124), whereas the first order diffracted light is directed through the waveguide 102 toward the eye 106 of the user (arrow 126). Such first order diffracted light (arrow 126 can cause rainbow artifacts that are visible to the eye 106 of the user. To reduce or eliminate rainbow artifacts that become visible to the eye 106 of the user, one or more angular dependent filters (and/or other components) may be implemented with the waveguide 102 in a waveguide display system.

Figure 2A:
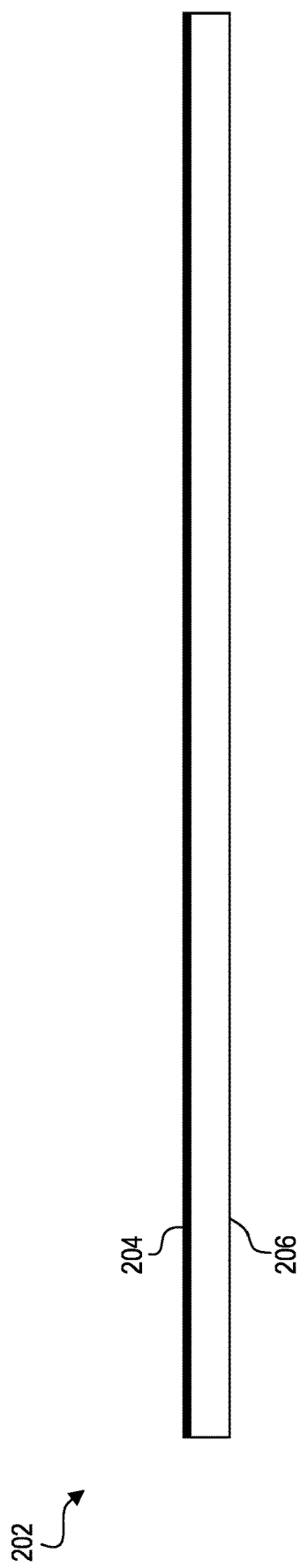
FIG. 2A through 2C illustrate aspects of an example angular dependent filter for mitigating rainbow artifacts.
Figure 2B:
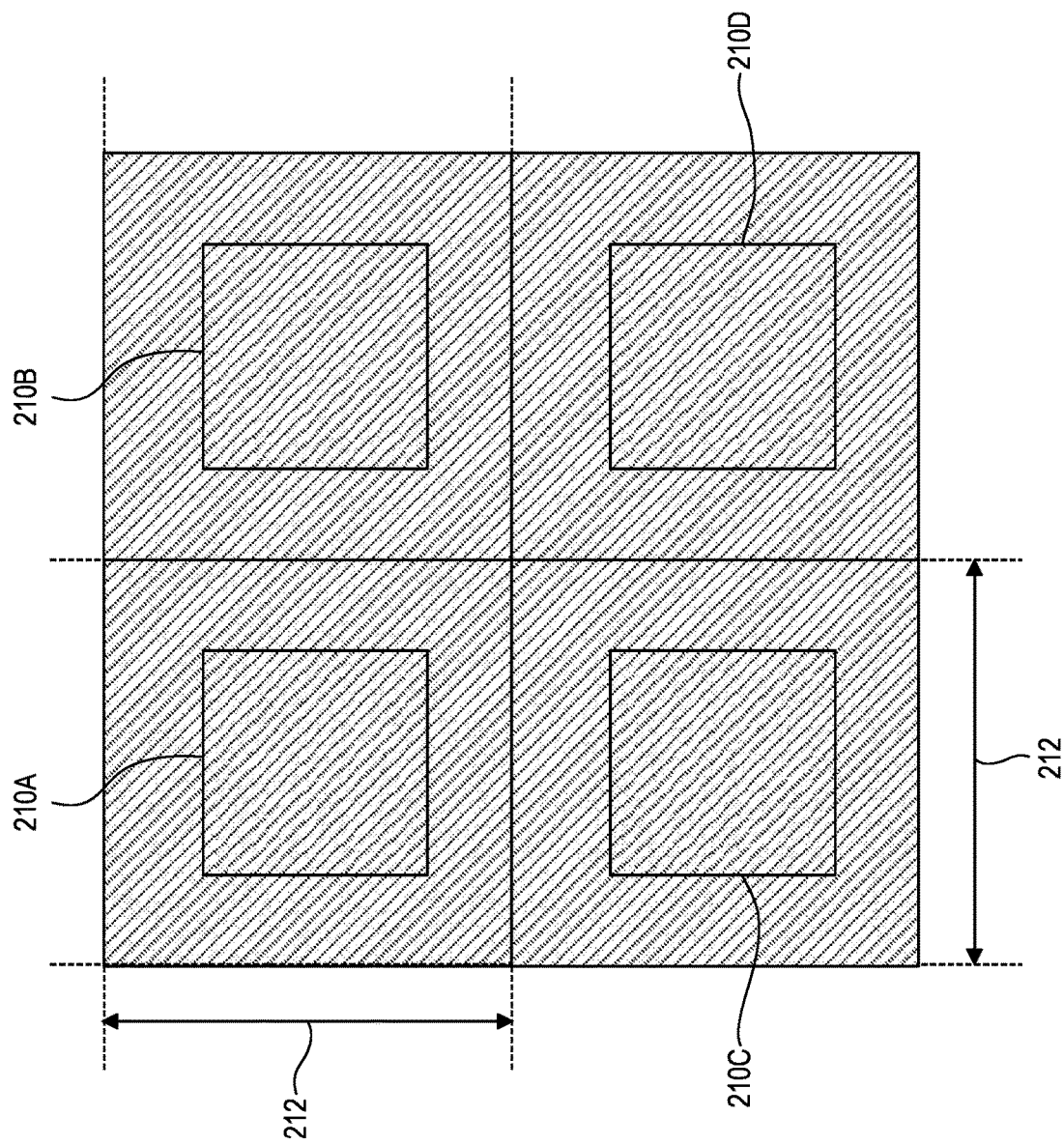
Figure 2C:
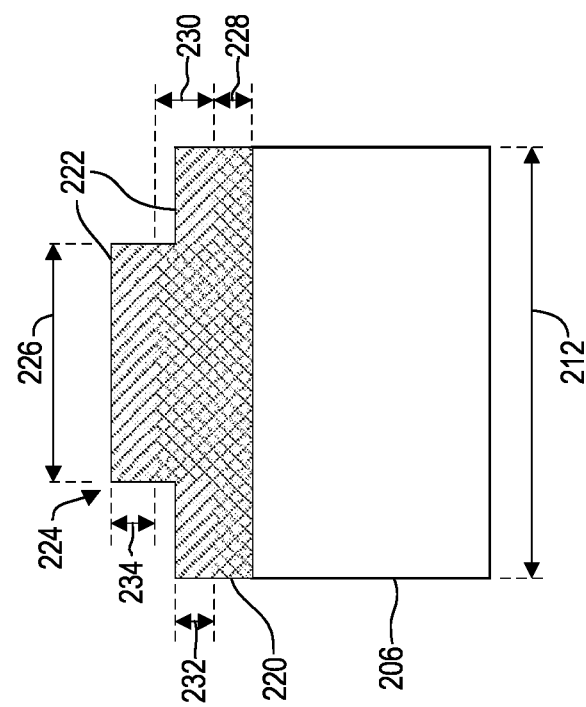

FIG. 2A through 2C illustrate aspects of an example angular dependent filter for mitigating rainbow artifacts. In particular, FIG. 2A illustrates a side view of a conceptual representation of an example angular dependent filter 202. The angular dependent filter 202 includes at least one layer 204 that includes a plurality of nanostructures. Although FIG. 2A only illustrates a single layer 204 of nanostructures, any number of layers may be implemented on an angular dependent filter 202 (e.g., two or more). The layer 204 of nanostructures is disposed over a substrate 206, which may take on various forms (e.g., an optical element such as a lens, a polarizer, a glass slide, etc.).

FIG. 2B illustrates a top view of a conceptual representation of a plurality of nanostructures 210 of the layer 204 of the angular dependent filter 202. FIG. 2B illustrates four nanostructures 210A, 210B, 210C, and 210D arranged in a periodic array with a sub-wavelength period 212 (e.g., where the period is smaller than visible spectrum wavelengths). In some instances, the sub-wavelength period of the plurality of nanostructures 210 prevents the plurality of nanostructures 210 from diffracting incident light in the visible spectrum (e.g., thereby preventing the plurality of nanostructures 210 from exacerbating rainbow artifacts). Although only four nanostructures of the plurality of nanostructures 210 are shown in FIG. 2B, a plurality of nanostructures 210 of a layer 204 of an angular dependent filter 202 may include any number of nanostructures. Furthermore, although FIG. 2B illustrates the nanostructures 210A, 210B, 210C, and 210D of the plurality of nanostructures 210 as arranged in a periodic structure, nanostructures of a layer 204 of an angular dependent filter 202 may comprise a non-periodic structure or a structure that includes periodic and non-periodic regions.

FIG. 2C illustrates a close-up side view of a conceptual representation of a particular nanostructure 210A of the plurality of nanostructures 210 of the layer 204 of the angular dependent filter 202. In the example of FIG. 2C, the nanostructure 210A includes a first material 220 disposed over the substrate 206 of the angular dependent filter 202 and a second material 222 disposed over the first material 220. The nanostructure 210A includes a raised portion 224, and the first material 220 and the second material 222 have different indices of refraction (e.g., the first material 220 may comprise a low-index material, such as a polymer, silicon nitride, and/or others; the second material 222 may comprise a high-index material, such amorphous silicon, titanium dioxide, and/or others). Such features contribute to the angularly dependent light transmission characteristics of the nanostructure 210A. The angularly dependent light transmission characteristics of the nanostructure 210A (and the plurality of nanostructures 210) are furthermore affected by other characteristics of the nanostructure 210A, such as the period 212, the pitch 226 of the raised portion 224, the materials selected for the first material 220 or the second material 222, the base height 228 of the first material 220, the raised height 230 of the first material 220, the base height 232 of the second material 222, the raised height 234 of the second material 222, the fabrication method(s) employed, the shape/geometry of the raised portion 224, and/or others.

The angularly dependent light transmission characteristics of the nanostructure 210A (as well as the other nanostructures of the angular dependent filter 202, and consequently the angular dependent filter 202 itself) can thus be modified by modifying the characteristics of the nanostructure 210A (and/or other nanostructures of the angular dependent filter 202). As indicated hereinabove, an angular dependent filter 202 may have different angularly dependent light transmission characteristics for different spatial regions of the angular dependent filter 202 (see FIG. 7). This can be facilitated by implementing different nanostructure characteristics for different regions of nanostructures of an angular dependent filter 202.

Figure 3:
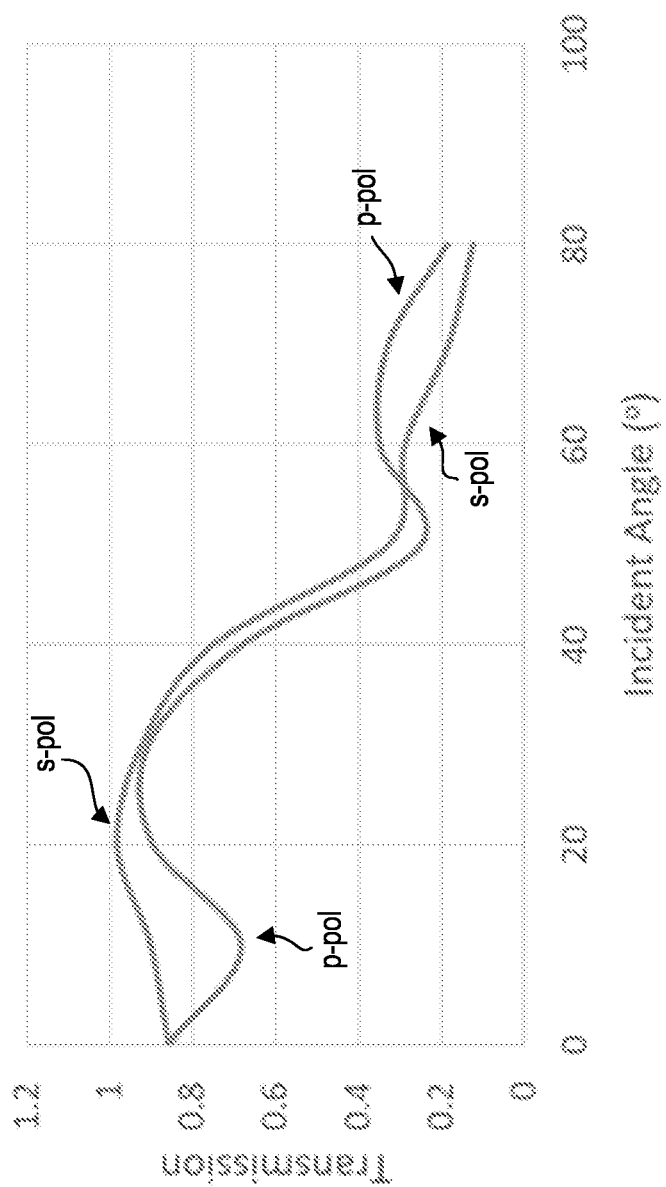
FIG. 3 illustrates an example angular transmission function for an example angular dependent filter.

The angularly dependent light transmission characteristics of an angular dependent filter 202 may be represented by an angular transmission function, which defines the light transmission of the angular dependent filter 202 as a function of incident angle. Angularly dependent light transmission characteristics of an angular dependent filter 202 may be different for different wavelengths and/or light polarizations. Accordingly, an angular transmission function (or set of angular transmission functions) of an angular dependent filter 202 may include different components/functions for different wavelengths and/or light polarizations. For example, FIG. 3 illustrates an example angular transmission function for an example angular dependent filter (e.g., or a region of an angular dependent filter). In particular, FIG. 3 illustrates an angular transmission function for an angular dependent filter showing angular transmission as a function of incident angle for s-polarized light and p-polarized light. As is evident from FIG. 3, an angular dependent filter may have different angularly dependent transmission characteristics for different polarizations of light.

An angular dependent filter 202 may have multiple regions with differing nanostructure characteristics, which may give rise to additional angular transmission functions (or sets of angular transmission functions) for a single angular dependent filter.

Figure 4A:
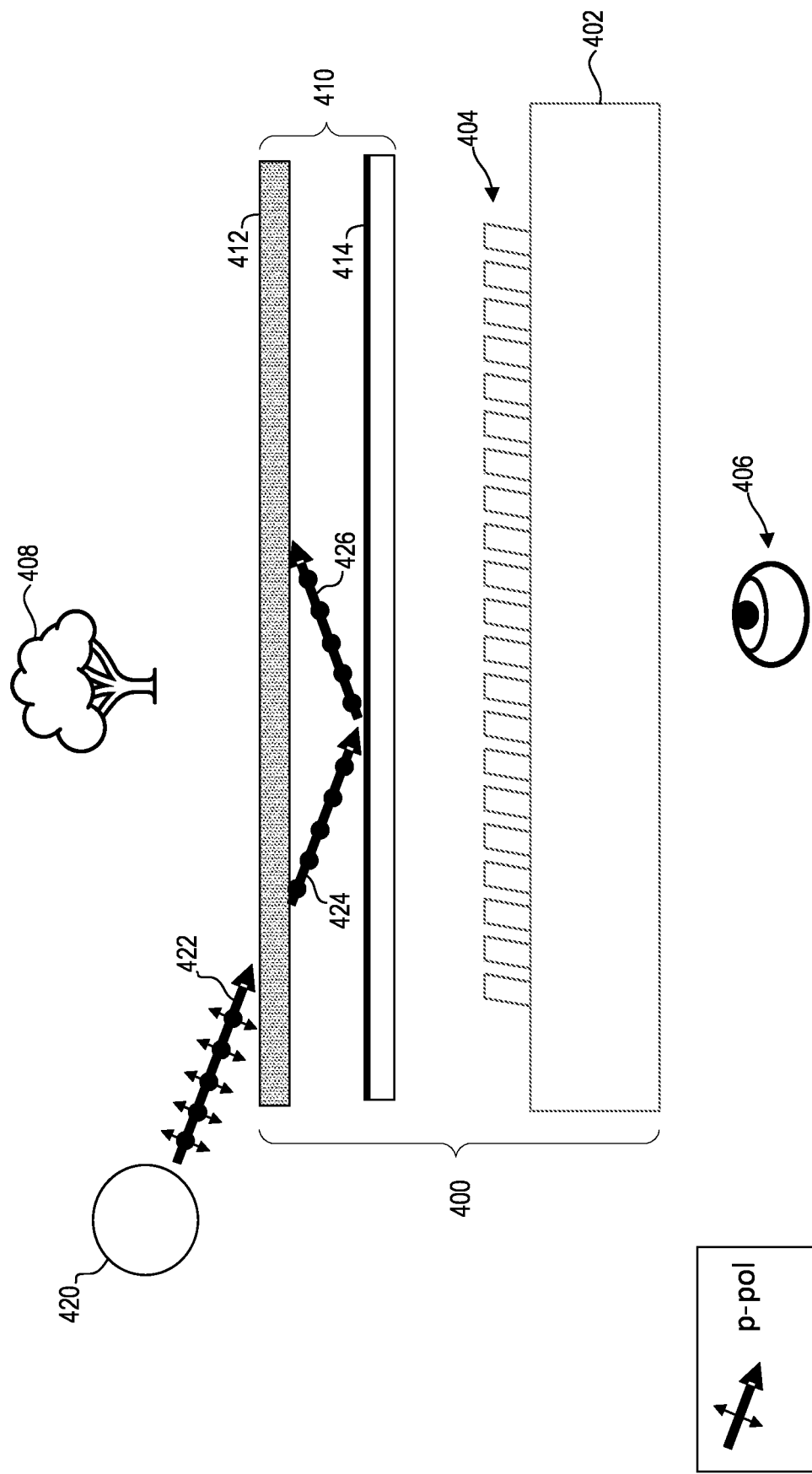
FIGS. 4A and 4B illustrate an example rainbow artifact mitigation system that includes a linear polarizer and angular dependent filter.

An angular dependent filter (e.g., corresponding to angular dependent filter 202) may be utilized in a rainbow artifact mitigation system of a waveguide display system to facilitate reduction or elimination of rainbow artifacts. FIG. 4A illustrates an example waveguide display system 400, which includes a rainbow artifact mitigation system 410. The rainbow artifact mitigation system 410 includes a linear polarizer 412 and an angular dependent filter 414. The linear polarizer 412 is configured to receive environment light and filter one polarization of light from the environment light. In the example of FIG. 4A, the linear polarizer 412 is adapted to filter p-polarized light, while allowing s-polarized light to transmit through the linear polarizer 412. For instance, FIG. 4A depicts light output by a light source 420 in the environment, where the output light includes s-polarized light and p-polarized light (arrow 422). The linear polarizer 412 filters the p-polarized light from the light output by the light source 420, resulting in transmission of s-polarized light through the linear polarizer 412 (arrow 424).

The angular dependent filter 414 of the rainbow artifact mitigation system 410 corresponds generally to the angular dependent filter 202 discussed hereinabove. For instance, angularly dependent light transmission characteristics of the angular dependent filter 414 may be defined by one or more angular transmission functions. The angular dependent filter 414 of the example of FIG. 4A is specifically configured for use in combination with the linear polarizer 412 to form the rainbow artifact mitigation system 410. In particular, the angular dependent filter 414 is configured to at least partially mitigate transmission of s-polarized light (which transmits through the linear polarizer 412) for high angles of incidence (e.g., for incident angles above about 40°, 45°, 50°, 55°, 60°, 65°, 70°, 75°, 80°, 85°, etc.). FIG. 4A illustrates the high incident angle s-polarized light that transmits through the linear polarizer (arrow 424) being reflected, absorbed, and/or scattered by the angular dependent filter 414 (arrow 426) to prevent the s-polarized light from reaching the grating structure 404 of the waveguide 402 of the waveguide display system 400.

In view of the foregoing, the linear polarizer 412 and the angular dependent filter 414 may operate in conjunction with one another as a rainbow artifact mitigation system 410 to prevent high incident angle light from reaching the grating structure 404 of the waveguide display system 400, thereby reducing or mitigating rainbow artifacts. While preventing at least some high-incident angle light from reaching the grating structure, the rainbow artifact mitigation system 410 may transmit low incident angle light (e.g., below about 60°, 55°, 50°, 45°, 40°, 35°, 30°, 25°, 20°, 15°, 10°, 5°, etc.) to enable users to see their real-world environment. For example, FIG. 4B illustrates light propagating from an object 408 in the environment toward the waveguide display system 400 (arrow 430), with the p-polarized light being filtered by the linear polarizer 412 allowing the s-polarized light to transmit through the linear polarizer 412 (arrow 432) and through the angular dependent filter 414 (arrow 434) to reach the grating structure 404 of the waveguide 402, which allows 0 order light to reach the eye 406 of the user through the waveguide 402 (arrow 436) while diffracting first order light through the waveguide 402 away from the eye 406 of the user (arrows 438).

Figure 4B:
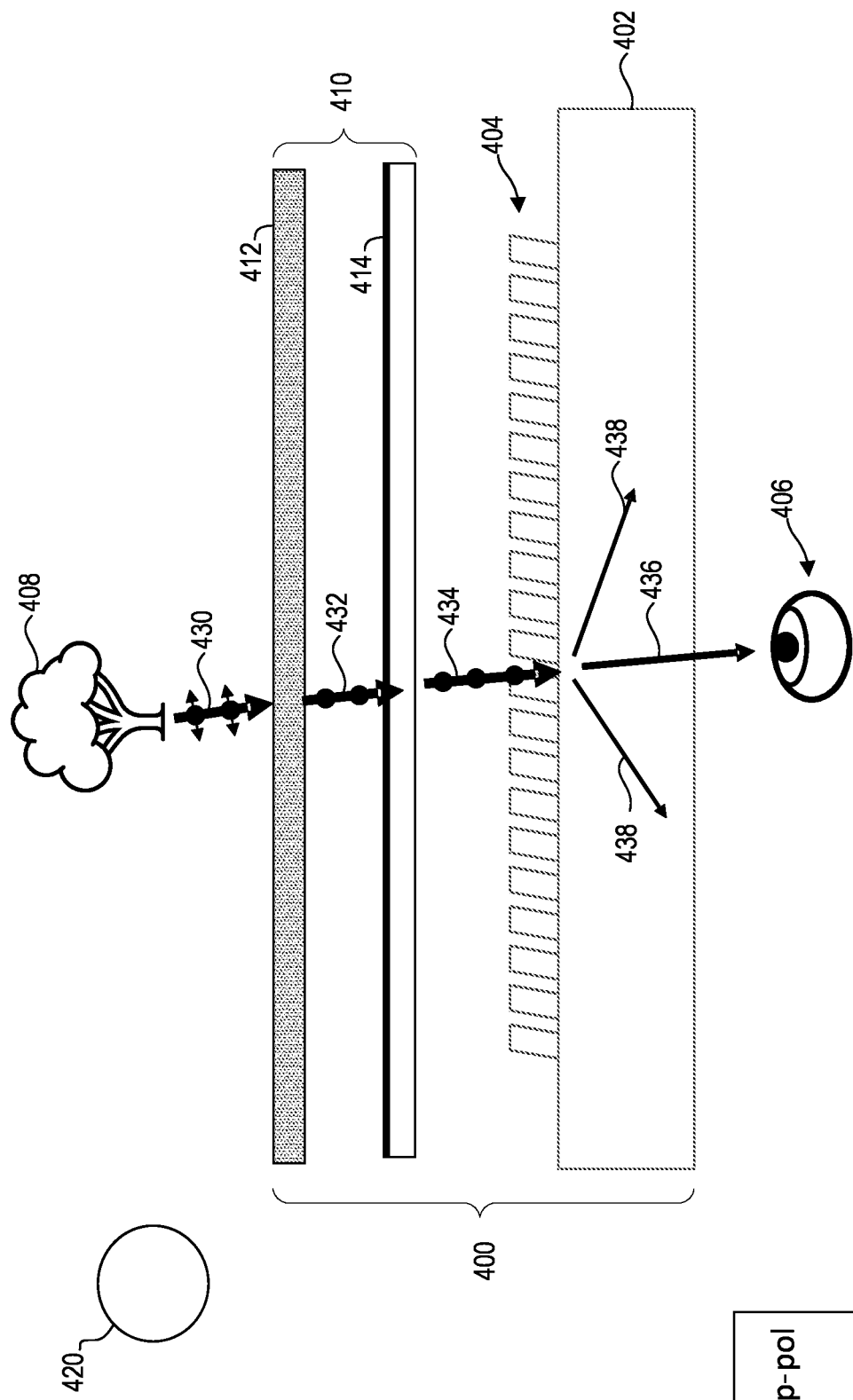

Although FIGS. 4A and 4B focus on an example in which the linear polarizer 412 is configured to filter p-polarized light, the linear polarizer may alternatively be configured to filter s-polarized light, and the angular dependent filter 414 may be configured to mitigate transmission of s-polarized light at high angles of incidence.

Figure 5A:
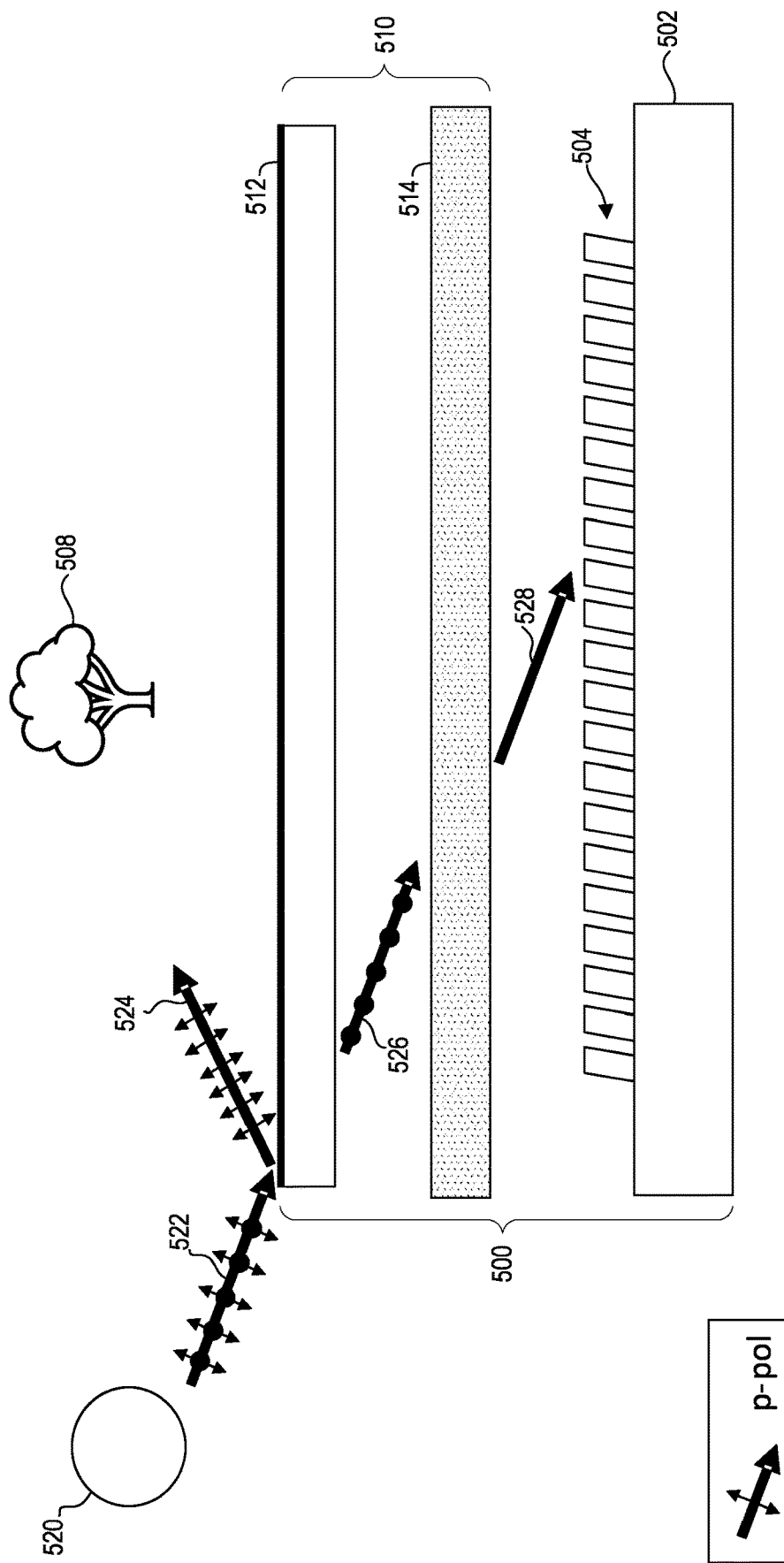

FIG. 5A illustrates an example waveguide display system 500 that includes an alternative rainbow artifact mitigation system 510. In particular, the rainbow artifact mitigation system 510 of FIG. 5A includes an angular dependent filter 512 and a polarization rotator 514. The angular dependent filter 512 corresponds generally to the angular dependent filter 202 described hereinabove. For instance, angularly dependent light transmission characteristics of the angular dependent filter 512 may be defined by one or more angular transmission functions. The angular dependent filter 512 of the example of FIG. 5A is configured to at least partially mitigate transmission of p-polarized light for high incident angles. FIG. 5A depicts light output by a light source 520 in the environment, where the output light includes s-polarized light and p-polarized light (arrow 522). The angular dependent filter 512 reflects, absorbs, and/or scatters at least some p-polarized high incident angle portions of the light output by the light source 520 (arrow 524), while allowing at least some s-polarized light to transmit through the angular dependent filter 512 (arrow 526).

The high incident angle s-polarized light that transmits through the angular dependent filter 512 (arrow 526) reaches the polarization rotator 514, which is configured to rotate the polarization of received s-polarized light to transmit light of a target polarization (arrow 528). The target polarization is a polarization that only weakly or minorly interacts with the grating structure 504 of the waveguide 502 of the waveguide display system 500, such that the grating structure 504 only minorly (if at all) diffracts light of the target polarization (which can result in reduced or eliminated rainbow artifacts caused by the grating structure 504 when light of the target polarization is received thereby). The target polarization may be selected based upon diffraction characteristics of the grating structure 504, and the polarization rotator 514 may be selected/manufactured to rotate s-polarized light into light of the target polarization. In this regard, the grating structure 504 may be configured to exhibit minimal diffraction of light of the target polarization through the waveguide 502 toward an eye of a user (not shown in FIG. 5A).

In view of the foregoing, the angular dependent filter 512 and the polarization rotator 514 may operation in conjunction with one another as a rainbow artifact mitigation system 510 to at least partially prevent high incident angle light from diffracting through the grating structure 504 of the waveguide display system 400 in a manner that would cause rainbow artifacts. While performing such a function, the rainbow artifact mitigation system 510 may still allow low incident angle light to reach the grating structure 504 and waveguide 502 to enable users to see their real-world environment. For example, FIG. 5B illustrates light propagating from an object 508 in the environment toward the waveguide display system 500 (arrow 530), with both p-polarized and s-polarized light transmitting through the angular dependent filter 512 (arrow 532), with rotated p-polarized and s-polarized light transmitting through the polarization rotator 514 (arrow 534), and with the rotated p-polarized and s-polarized light reaching the grating structure 504 of the waveguide 502, which allows 0 order light (arrow 536) to transmit through the waveguide 502 toward the eye of the user (not shown in FIG. 5A) while diffracting first order light (arrows 538) through the waveguide 502 away form the eye of the user.

Although FIGS. 5A and 5B focus on an example in which the angular dependent filter 512 is configured to mitigate transmission of high incident angle p-polarized light, the angular dependent filter 512 may alternatively be configured to mitigate transmission of high incident angle s-polarized light. Furthermore, although FIGS. 5A and 5B focus on an example that utilizes a polarization rotator in combination with an angular dependent filter to form a rainbow artifact mitigation system, a polarization rotator may be omitted from a rainbow artifact mitigation system in some embodiments. For example, in some implementations, an angular dependent filter is configured to, for high incident angles, reflect light of a polarization that interacts strongly with the grating structure of the waveguide and transmit light of a target polarization that interacts weakly/minimally with the grating structure of the waveguide.

Figure 6A:
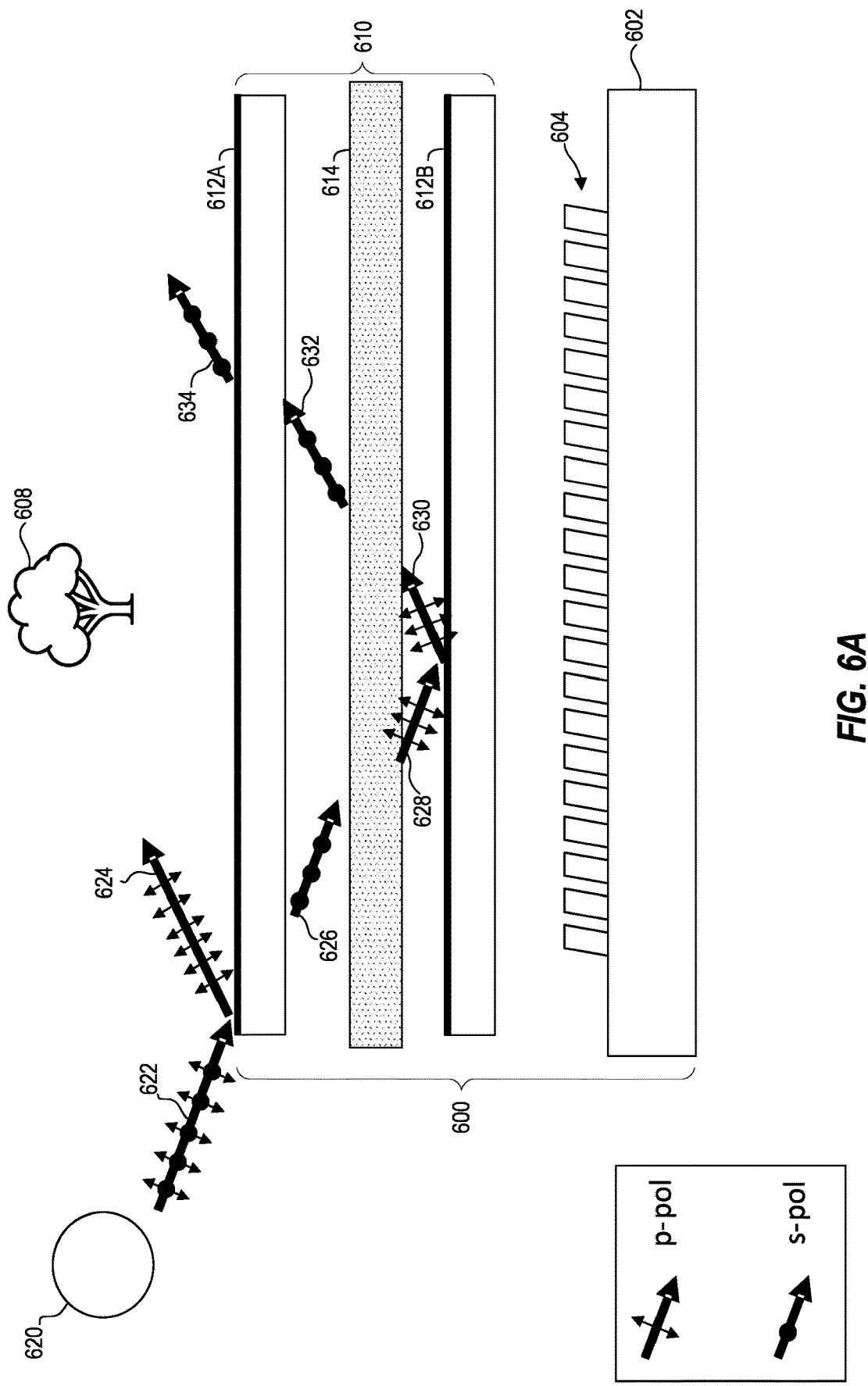
FIGS. 6A and 6B illustrates an example rainbow artifact mitigation system that includes a pair of angular dependent filters and a polarization rotator.

FIG. 6A illustrates an example waveguide display system 600 that includes yet another an alternative rainbow artifact mitigation system 610. In particular, the rainbow artifact mitigation system 610 of FIG. 6A includes an angular dependent filter 612A, a polarization rotator 614, and another angular dependent filter 612B. The angular dependent filters 612A and 612B correspond generally to the angular dependent filter 202 described hereinabove. For instance, angularly dependent light transmission characteristics of the angular dependent filter 612A may be defined by one or more angular transmission functions, and angularly dependent light transmission characteristics of the angular dependent filter 612B may be defined by one or more second angular transmission functions. The angular dependent filters 612A and 612B of the example of FIG. 6A are configured to at least partially mitigate transmission of p-polarized light for high incident angles. FIG. 6A depicts light output by a light source 620 in the environment, where the output light includes s-polarized light and p-polarized light (arrow 622). The angular dependent filter 612A reflects, absorbs, and/or scatters at least some p-polarized high incident angle portions of the light output by the light source 620 (arrow 624), while allowing at least some s-polarized light to transmit through the angular dependent filter 612A (arrow 626).

The high incident angle s-polarized light that transmits through the angular dependent filter 612A (arrow 626) reaches the polarization rotator 614, which is configured to rotate the polarization of received s-polarized light to transmit light p-polarized light (arrow 628). In this regard, the polarization rotator 614 may be implemented as a quarter wave plate.

As noted above, like the angular dependent filter 612A, the angular dependent filter 612B of the example of FIG. 6A is configured to at least partially mitigate transmission of p-polarized light for high incident angles. Accordingly, at least some of the high incident angle p-polarized light that transmits through the polarization rotator 614 (arrow 628) is reflected, absorbed, and/or scattered by the angular dependent filter 612B (arrow 630). FIG. 6A furthermore illustrates light reflected by the angular dependent filter 612B (arrow 630) transmitting again through the polarization rotator 614 to form s-polarized light (arrow 632), which transmits through the angular dependent filter 612A into the environment (arrow 634).

In view of the foregoing, the angular dependent filters 612A and 612B and the polarization rotator 614 may operation in conjunction with one another as a rainbow artifact mitigation system 610 to at least partially prevent high incident angle light from reaching the grating structure 604 of the waveguide display system 600, thereby mitigating or eliminating rainbow artifacts for the waveguide display system 600. While performing such a function, the rainbow artifact mitigation system 610 may still allow low incident angle light to reach the grating structure 604 and waveguide 602 to enable users to see their real-world environment. For example, FIG. 6B illustrates light propagating from an object 608 in the environment toward the waveguide display system 600 (arrow 636), with both p-polarized and s-polarized light transmitting through the angular dependent filter 612A (arrow 638), with rotated p-polarized and s-polarized light transmitting through the polarization rotator 614 (arrow 640), and with the rotated p-polarized and s-polarized light transmitting through the angular dependent filter 612B (arrow 642) and reaching the grating structure 604 of the waveguide 602, which allows 0 order light (arrow 644) to transmit through the waveguide 602 toward the eye of the user (not shown in FIG. 6A) while diffracting first order light (arrows 646) through the waveguide 502 away from the eye of the user.

Figure 6B:
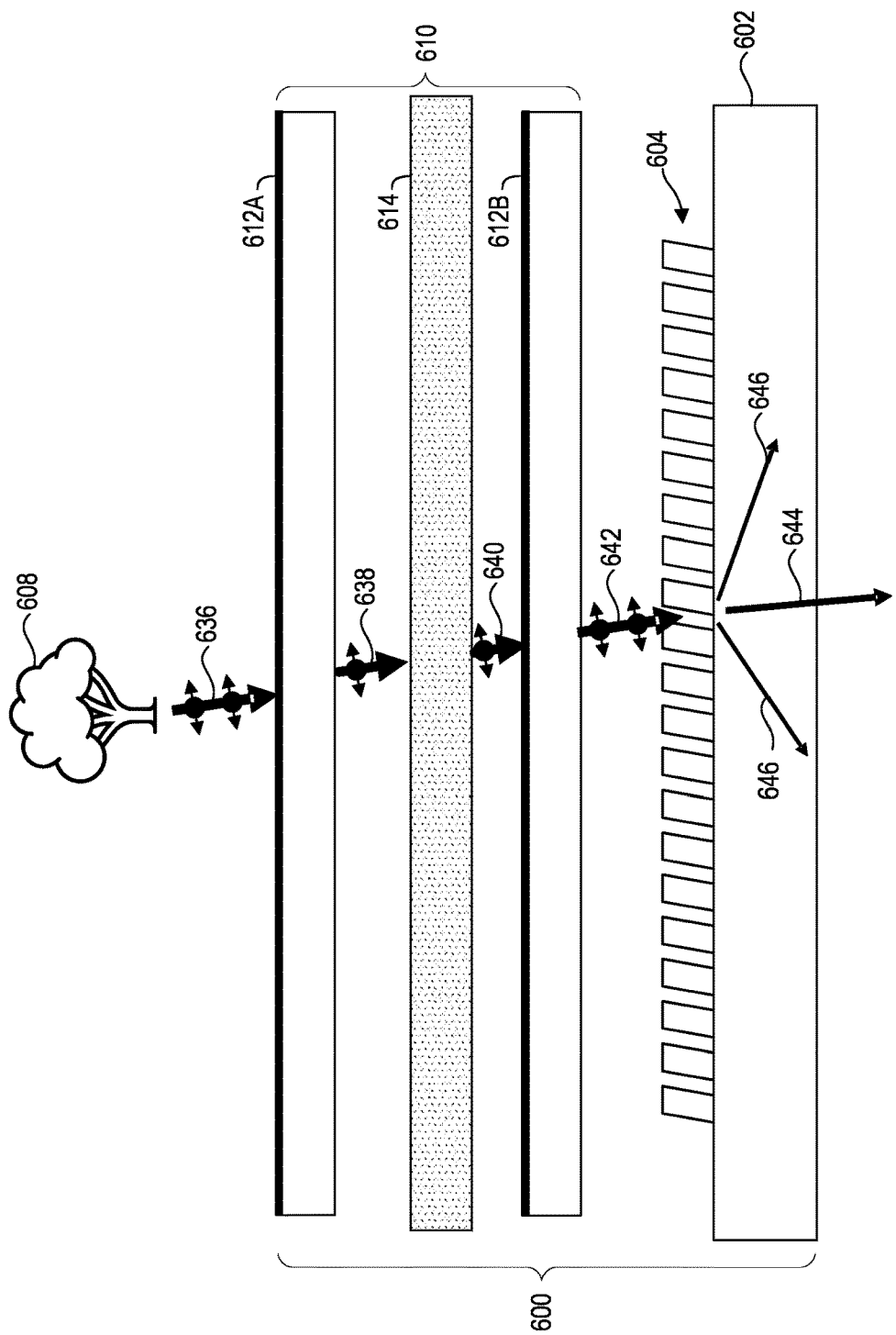
Figure 6B:
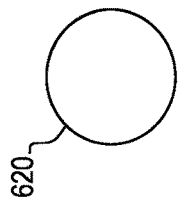

Although FIGS. 6A and 6B focus on an example in which the angular dependent filters 612A and 612B are configured to mitigate transmission of high incident angle p-polarized light, the angular dependent filters 612A and 612B may alternatively be configured to mitigate transmission of high incident angle s-polarized light, and the polarization rotator may be configured to rotate p-polarized light into s-polarized light.

Figure 7:
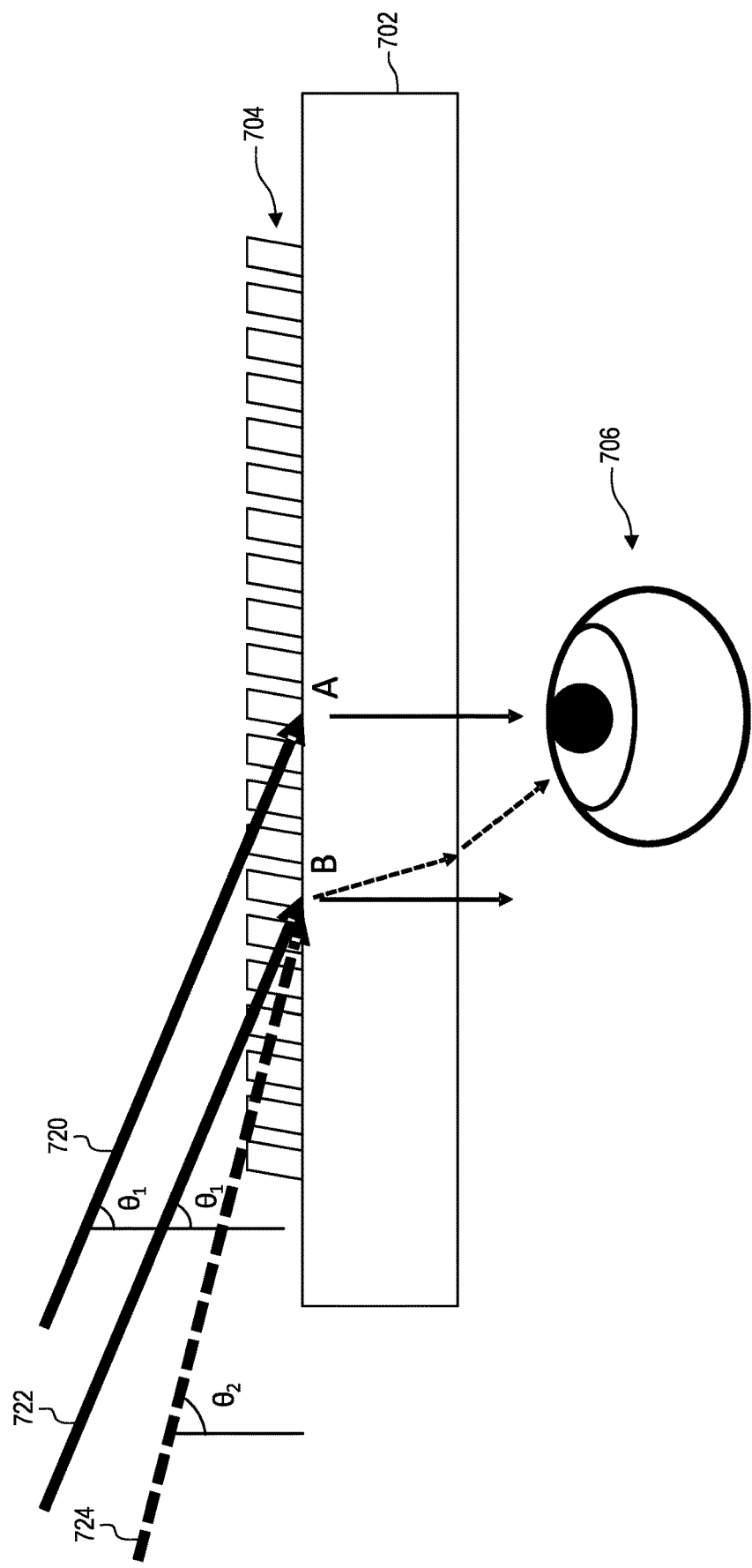
FIG. 7 illustrates a conceptual representation of spatial dependency of the rainbow effect.

As noted hereinabove, the occurrence of rainbow artifacts in a waveguide display system can depend on the location on the grating structure of the waveguide (relative to the user's eye) at which incident light reaches the grating structure of the waveguide. This can cause light of the same wavelength and same incident angle reaching different locations of a grating structure to have different rainbow artifact outcomes (e.g., where light reaching one grating structure location causes rainbow artifacts, and where light reaching the other grating structure location does not cause rainbow artifacts). For example, FIG. 7 illustrates a waveguide 702 with a grating structure 704 receiving incident light of the same wavelength (e.g., blue) and at different incident angles and locations on the grating structure 704 relative to the eye 706 of the user. Incident light at angle $\theta_1$ reaching location "A" (arrow 720) is diffracted by the grating structure 704 toward the eye 706 of the user, whereas incident light at angle $\theta_1$ reaching location "B" (arrow 722) is not diffracted toward the eye 706 of the user. However, incident light at angle $\theta_2$ reaching location "B" (arrow 724) is diffracted toward the eye 706 of the user.

Figure 8:
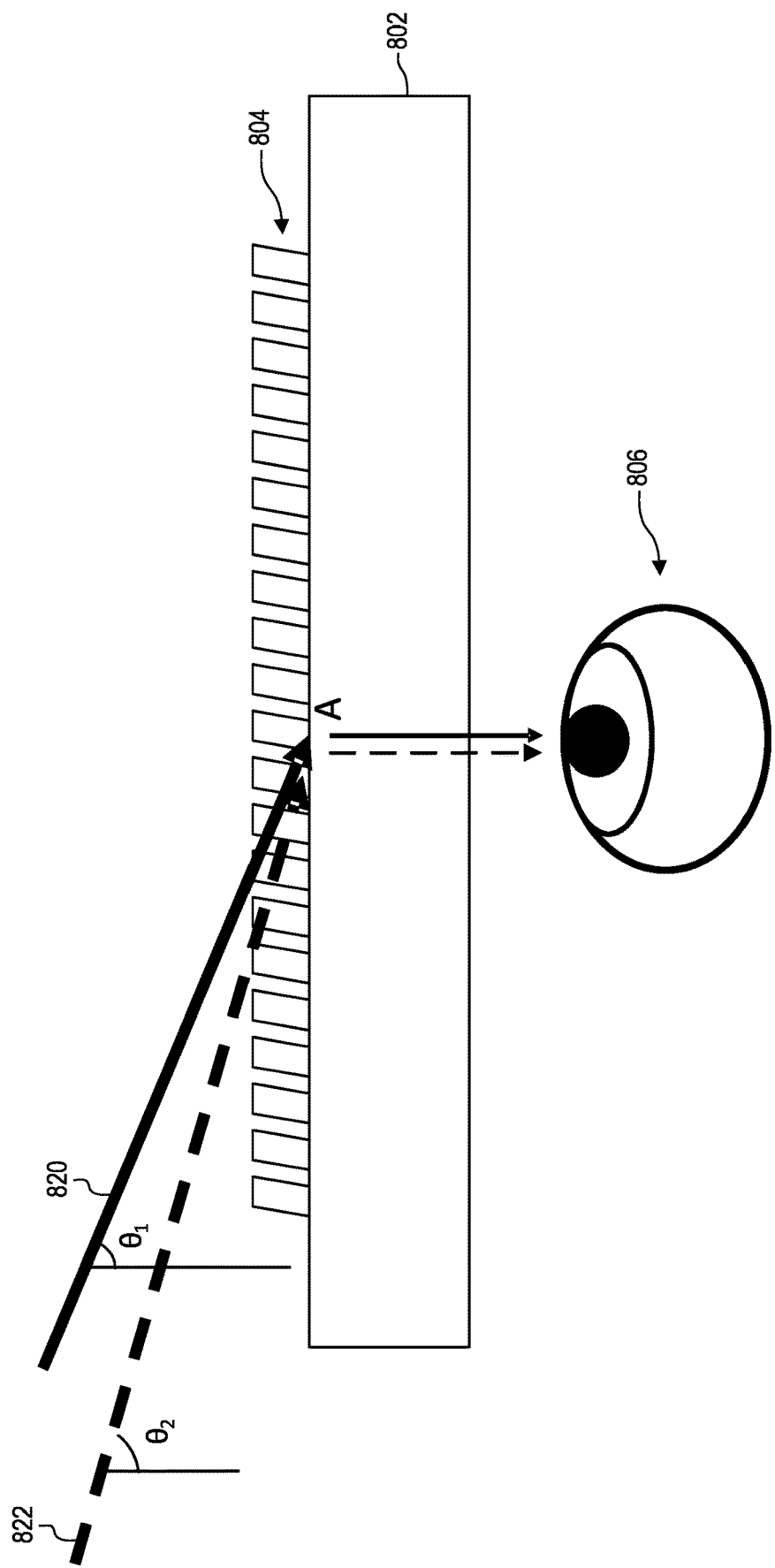
FIG. 8 illustrates a conceptual representation of wavelength dependency of the rainbow effect.

As furthermore noted above, the spatial dependency of the rainbow effect is different for different wavelengths of light, which can cause light of different wavelengths and different incident angles reaching the same spatial location on a grating structure to both cause rainbow artifacts (despite the different incident angles). For example, FIG. 8 illustrates a waveguide 802 with a grating structure 804 receiving incident light of different wavelengths (e.g., blue and red) at different incident angles but at the same location on the grating structure 804 relative to the eye 806 of the user. Blue incident light at angle $\theta_1$ reaching location "A" (arrow 820) is diffracted by the grating structure 804 toward the eye 806 of the user, and red incident light at angle $\theta_2$ reaching location "A" (arrow 822) is also diffracted by the grating structure 804 toward the eye 806 of the user (despite the difference in incident angle).

To account for the spatial and/or wavelength dependence of the rainbow effect, an angular dependent filter as described herein may be associated with multiple, different angular transmission functions that define light transmission as a function of incident angle for different regions of the angular dependent filter and/or for different wavelengths. Consequently, in some implementations, nanostructures in the different regions of the angular dependent filter may have at least partially differing nanostructure characteristics, such as, by way of non-limiting example, period, pitch, height, material, fabrication method, shape, and/or others.

Figure 9:
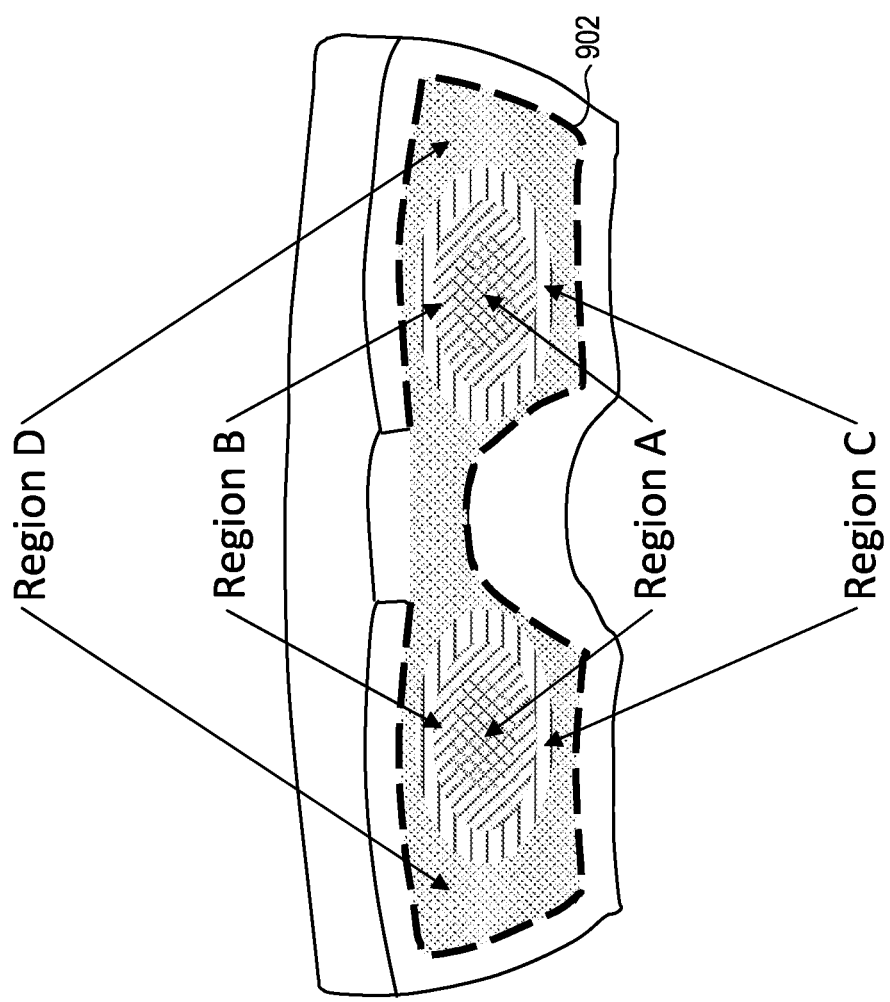
FIG. 9 illustrates an example angular dependent filter of a display system with spatially varying angular transmission characteristics.
Figure 10:
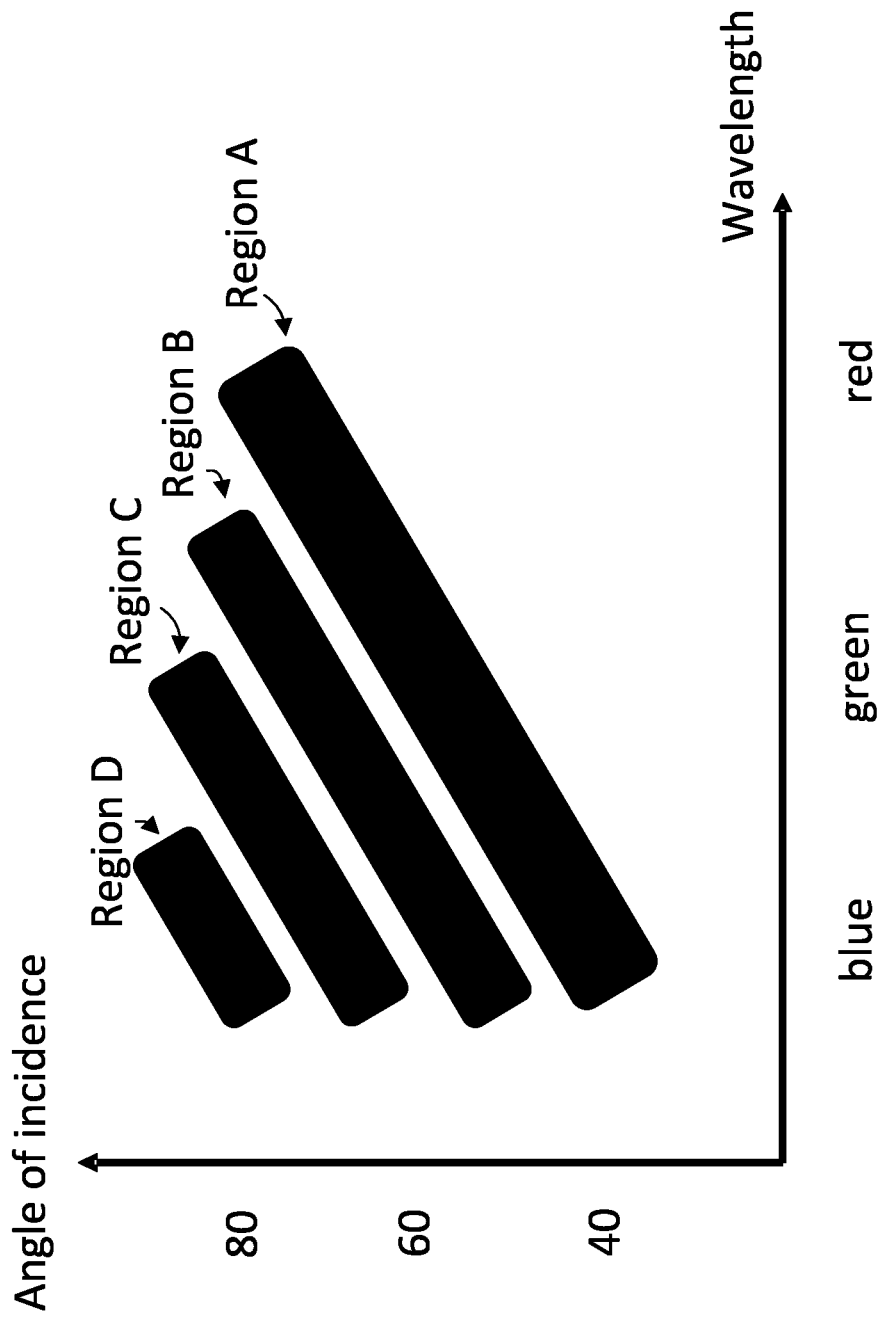
FIG. 10 illustrates an example angular transmission function for an angular dependent filter with spatially varying and wavelength varying transmission characteristics.

FIG. 9 illustrates a conceptual representation of a front view an example angular dependent filter 902 with different angular transmission characteristics associated with different spatial regions of the angular dependent filter 902. For instance, the example angular dependent filter 902 of FIG. 9 includes four different regions for each user eye, including Region A, Region B, Region C, and Region D (an angular dependent filter may include any number of regions in accordance with the present disclosure). In the example of FIG. 9, the different regions have different nanostructure characteristics, resulting in different angular transmission functions for each different region. FIG. 10 illustrates a conceptual representation of a graph depicting the angular transmission functions for the different regions of the angular dependent filter 902 of FIG. 9 (labeled "Region A", "Region B", "Region C", and "Region C"). The dark portions of the graph of FIG. 10 correspond to low transmission for different wavelength and incident angle combinations. One will appreciate, in view of the present disclosure, that the example regions and angular transmission functions of FIGS. 9 and 10 are provided by way of example only and are not limiting of the principles discussed herein.

Desired angular transmission functions for one or more regions of an angular dependent filter may be tuned to account for the spatial and/or wavelength dependency of the rainbow effect. For example, an initial nanostructure configuration may be utilized as input utilizing RCWA or FDTD techniques to simulate the angular transmission function for the initial nanostructure configuration. Band end shift techniques may be applied to one or more regions of the input nanostructure to facilitate tuning/modification of the simulated angular transmission function. Band end shift techniques may comprise modifying characteristics of the input nanostructure configuration (e.g., modifying period, pitch, height, materials, fabrication method, shape/geometry, and/or other aspects of the input nanostructure configuration). Such a process may be iterated (for any number of nanostructure regions) to determine a nanostructure configuration that achieves one or more desired angular transmission functions (e.g., for each region of an angular dependent filter).

Additional Details Related to Implementing the Disclosed Embodiments

Figure 11:
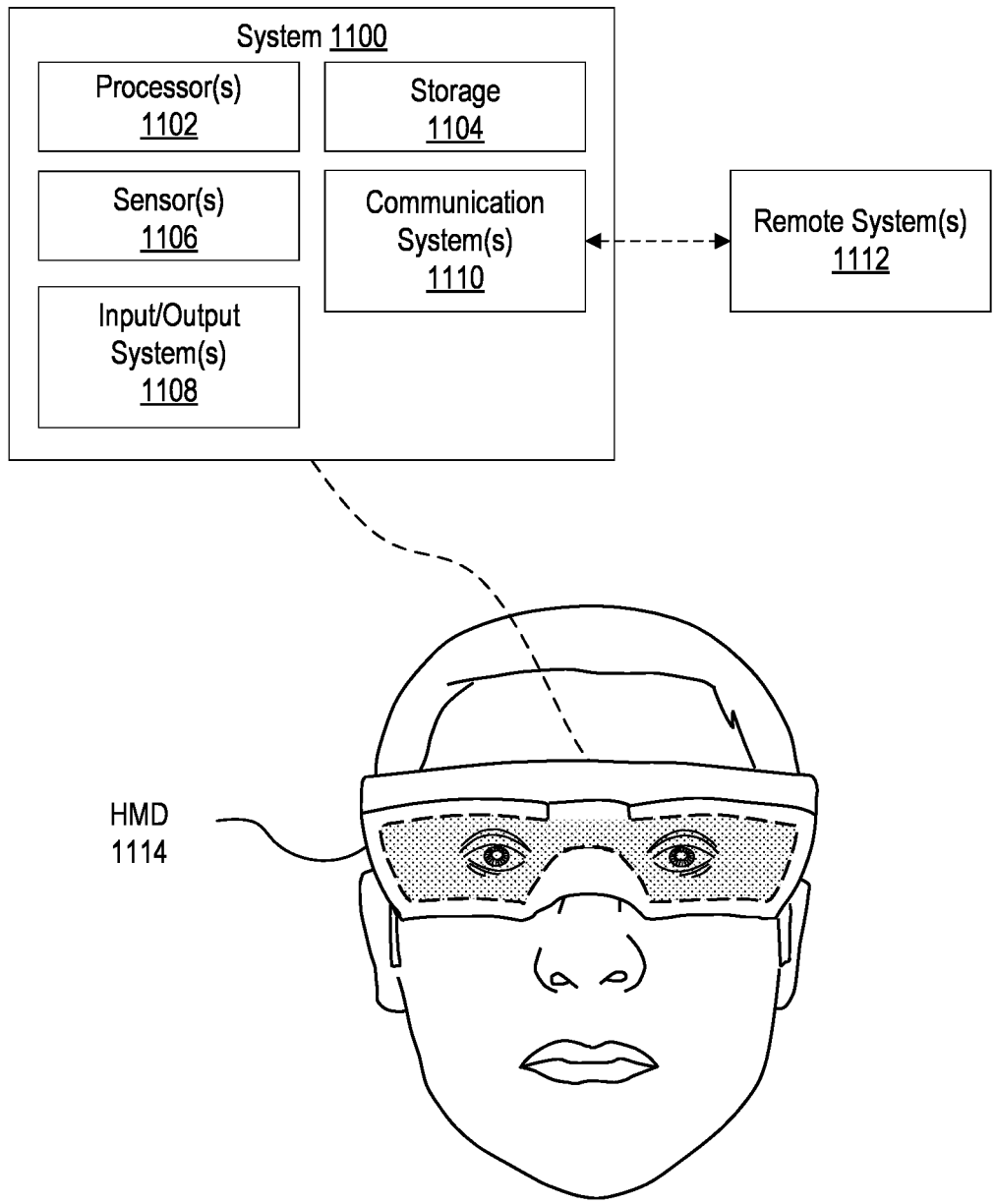
FIG. 11 illustrates example components of an example system that may include or be used to implement aspects of one or more disclosed embodiments.

FIG. 11 illustrates example components of a system 1100 that may comprise or implement aspects of one or more disclosed embodiments. FIG. 11 depicts the system 1100 as a head-mounted display 1114 (HMD 1114) configured for placement over a head of a user to display virtual content for viewing by the user. Such an HMD 1114 may comprise an augmented reality (AR) system, a virtual reality (VR) system, and/or any other type of HMD. Although the present disclosure focuses, in at least some respects, on a system 1100 implemented as an HMD 1114, it should be noted that the techniques described herein may be implemented using other types of systems/devices, without limitation.

FIG. 11 illustrates various example components of the system 1100. For example, FIG. 11 illustrates an implementation in which the system includes processor(s) 1102, storage 1104, sensor(s) 1106, I/O system(s) 1108, and communication system(s) 1110. Although FIG. 11 illustrates a system 1100 as including particular components, one will appreciate, in view of the present disclosure, that a system 1100 may comprise any number of additional or alternative components.

The processor(s) 1102 may comprise one or more sets of electronic circuitries that include any number of logic units, registers, and/or control units to facilitate the execution of computer-readable instructions (e.g., instructions that form a computer program). Such computer-readable instructions may be stored within storage 1104. The storage 1104 may comprise physical system memory and may be volatile, non-volatile, or some combination thereof. Furthermore, storage 1104 may comprise local storage, remote storage (e.g., accessible via communication system(s) 1110 or otherwise), or some combination thereof. Additional details related to processors (e.g., processor(s) 1102) and computer storage media (e.g., storage 1104) will be provided hereinafter.

As will be described in more detail, the processor(s) 1102 may be configured to execute instructions stored within storage 1104 to perform certain actions. In some instances, the actions may rely at least in part on communication system(s) 1110 for receiving data from remote system(s) 1112, which may include, for example, separate systems or computing devices, sensors, and/or others. The communications system(s) 1110 may comprise any combination of software or hardware components that are operable to facilitate communication between on-system components/devices and/or with off-system components/devices. For example, the communications system(s) 1110 may comprise ports, buses, or other physical connection apparatuses for communicating with other devices/components. Additionally, or alternatively, the communications system(s) 1110 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 11 illustrates that a system 1100 may comprise or be in communication with sensor(s) 1106. Sensor(s) 1106 may comprise any device for capturing or measuring data representative of perceivable phenomenon. By way of non-limiting example, the sensor(s) 1106 may comprise one or more image sensors, microphones, thermometers, barometers, magnetometers, accelerometers, gyroscopes, and/or others.

Furthermore, FIG. 11 illustrates that a system 1100 may comprise or be in communication with I/O system(s) 1108. I/O system(s) 1108 may include any type of input or output device such as, by way of non-limiting example, a touch screen, a mouse, a keyboard, a controller, and/or others, without limitation. For example, the I/O system(s) 1108 may include a display assembly that may comprise any number of display panels, waveguide displays (as described hereinabove), optics, laser-based scanning display assemblies, and/or other components.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A waveguide display system configured for reduced rainbow artifacts, the waveguide display system comprising:
   a rainbow artifact mitigation system, comprising:
      a first angular dependent filter configured to receive environment light from an environment and to transmit the environment light according to one or more first angular transmission functions, the one or more first angular transmission functions defining light transmission for light of a first polarization as a function of incident angle for the first angular dependent filter, wherein the first angular dependent filter is configured to at least partially mitigate transmission of light of the first polarization for at least some incident angles above 40°, and wherein the first angular dependent filter is configured to at least partially transmit light of a second polarization for at least some incident angles above 40°; and
      a polarization rotator configured to receive light output by the first angular dependent filter and rotate a polarization of received light, wherein the polarization rotator is configured to rotate a polarization of light of the second polarization to output light of a target polarization for at least some incident angles above 40°; and
   a waveguide comprising a grating structure, the waveguide being configured to receive light output by the rainbow artifact mitigation system and to direct at least some received light toward an eye of a user, wherein the grating structure of the waveguide is configured for a weak interaction with light of the target polarization resulting in reduced diffraction of light of the target polarization by the grating structure for at least some incident angles above 40°, wherein the rainbow artifact mitigation system contributes to a mitigation or elimination of rainbow artifacts caused by the grating structure of the waveguide.

2. The waveguide display system of claim 1, wherein either (i) the first polarization comprises p polarization, and the second polarization comprises s polarization, or (ii) the first polarization comprises s polarization, and the second polarization comprises p polarization.

3. The waveguide display system of claim 1, wherein the first angular dependent filter comprises a plurality of nanostructures, the nanostructures of the plurality of nanostructures being arranged in a periodic array with a sub-wavelength period.

4. The waveguide display system of claim 1, wherein the grating structure of the waveguide comprises a surface relief grating (SRG), wherein the waveguide is configured to internally reflect display light toward the SRG, and wherein the SRG is configured to outcouple the display light toward an eye of user.

5. A waveguide display system configured for reduced rainbow artifacts, the waveguide display system comprising:
   a rainbow artifact mitigation system, comprising:
      a first angular dependent filter configured to receive environment light from an environment and to transmit the environment light according to one or more first angular transmission functions, the one or more first angular transmission functions defining light transmission for light of a first polarization as a function of incident angle for the first angular dependent filter, wherein the first angular dependent filter is configured to at least partially mitigate transmission of light of the first polarization for at least some incident angles above 40°, and wherein the first angular dependent filter is configured to at least partially transmit light of a second polarization for at least some incident angles above 40°;
      a polarization rotator configured to receive light output by the first angular dependent filter and rotate a polarization of received light, wherein the polarization rotator is configured to rotate a polarization of light of the second polarization to output light of the first polarization for at least some incident angles above 40°; and
      a second angular dependent filter configured to receive light of the first polarization output by the polarization rotator and to transmit the light of the first polarization according to one or more second angular transmission functions, the one or more second angular transmission functions defining light transmission for light of the first polarization as a function of incident angle for the second angular dependent filter; and a waveguide comprising a grating structure, the waveguide being configured to receive light output by the rainbow artifact mitigation system and to direct at least some received light toward an eye of a user, wherein the rainbow artifact mitigation system contributes to a mitigation or elimination of rainbow artifacts caused by the grating structure of the waveguide.

6. The waveguide display system of claim 5, wherein either (i) the first polarization comprises p polarization, and the second polarization comprises s polarization, or (ii) the first polarization comprises s polarization, and the second polarization comprises p polarization.

7. The waveguide display system of claim 5, wherein the first angular dependent filter comprises a plurality of nanostructures, the nanostructures of the plurality of nanostructures being arranged in a periodic array with a sub-wavelength period.

8. The waveguide display system of claim 5, wherein the grating structure of the waveguide comprises a surface relief grating (SRG), wherein the waveguide is configured to internally reflect display light toward the SRG, and wherein the SRG is configured to outcouple the display light toward an eye of user.

9. A waveguide display system configured for reduced rainbow artifacts, the waveguide display system comprising:
a rainbow artifact mitigation system, comprising:
a first angular dependent filter configured to receive environment light from an environment and to transmit the environment light according to one or more first angular transmission functions, the one or more first angular transmission functions defining light transmission for light of a first polarization as a function of incident angle for the first angular dependent filter, wherein the first angular dependent filter is configured to at least partially mitigate transmission of light of the first polarization for at least some incident angles above 40°, wherein the first angular dependent filter is configured to at least partially transmit light of a target polarization for at least some incident angles above 40°; and a waveguide comprising a grating structure, the waveguide being configured to receive light output by the rainbow artifact mitigation system and to direct at least some received light toward an eye of a user, wherein the grating structure of the waveguide is configured for a strong interaction with light of the first polarization, and wherein the grating structure of the waveguide is configured for a weak interaction with light of the target polarization resulting in reduced diffraction of light of the target polarization by the grating structure for at least some incident angles above 40°, wherein the rainbow artifact mitigation system contributes to a mitigation or elimination of rainbow artifacts caused by the grating structure of the waveguide.

10. The waveguide display system of claim 9, wherein the first angular dependent filter comprises a plurality of nanostructures, the nanostructures of the plurality of nanostructures being arranged in a periodic array with a sub-wavelength period.

11. The waveguide display system of claim 9, wherein the grating structure of the waveguide comprises a surface relief grating (SRG), wherein the waveguide is configured to internally reflect display light toward the SRG, and wherein the SRG is configured to outcouple the display light toward an eye of user.

* * * * *